United States Patent Office 3,652,579
Patented Mar. 28, 1972

3,652,579
1-METHYL-2-SUBSTITUTED 5-NITROIMIDAZOLES
Max Hoffer, Nutley, and Alexander MacDonald, Jr., Fairfield, N.J., assignors to Hoffmann-La Roche Inc., Nutley, N.J.
No Drawing. Filed June 26, 1969, Ser. No. 836,942
Int. Cl. C07d 49/36
U.S. Cl. 260—309
10 Claims

ABSTRACT OF THE DISCLOSURE

Novel 1-methyl-2-substituted 5-nitroimidazoles, novel intermediates therefor and processes for their production are provided. The end products, 1-methyl-2-isopropyl-5-nitroimidazole, 1-methyl-2-(1-methyl-1-methoxyethyl)-5-nitroimidazole and 1-methyl-2-(1-methyl - 1 - hydroxyethyl)-5-nitroimidazole, are useful in the treatment of protozoal and bacterial infections.

BRIEF SUMMARY OF THE INVENTION

The present invention relates generally to 1-methyl-2-substituted 5-nitroimidazoles represented by the following formula:

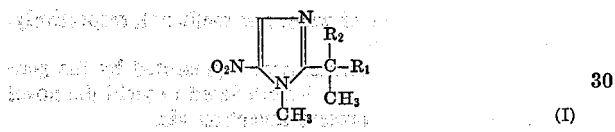

(I)

wherein $R_1$ may be hydroxy or methoxy; $R_2$ may be methyl, or $R_1$ plus $R_2$ is the group $=CH_2$, novel intermediates therefor and processes for their production.

DETAILED DESCRIPTION OF THE INVENTION

The novel end products of the present invention, i.e., the 1-methyl-2-substituted 5-nitroimidazoles represented by Formula I are prepared by a novel process which involves the use of several novel intermediates. This process may be outlined as follows.

The starting material is an aldehyde represented by the general formula

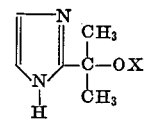

(II)

wherein X may be hydrogen or methyl. The aldehyde is reacted with glyoxal and ammonia at a temperature of from about 0° C. to about 80° C. To insure completion of the reaction, the mixture may be allowed to stand at room temperature, e.g., from about 20° C. to about 25° C., for 48 hours. It is preferred, however, to allow the reaction mixture to stand at a temperature of from about 0° to about 10° C. overnight. The product is then isolated by conventional manner, e.g., filtration, or extraction with a suitable organic solvent, preferably ethyl acetate. The product is recrystallized from an organic solvent such as acetone. The product is represented by the general formula

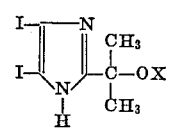

(III)

wherein X has the meaning given above.

The compounds of Formula III are next iodinated by known methods. One such suitable method comprises reacting an aqueous solution of a compound of Formula III with an aqueous solution of sodium iodide and iodine. This latter solution is slowly added to the imidazole solution together with an alkali, such as powdered anhydrous sodium carbonate. The reaction is conveniently carried out at room temperature, e.g., about 20° C. to 25° C., though higher or lower temperatures may be used. After completion of the reaction, the mixture is acidified with a weak acid, such as acetic acid, whereupon the product precipitates and is recovered by methods well known in the art such as filtration. The resulting novel diiodo intermediates are represented by the general formula

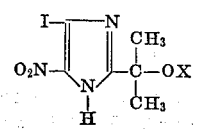

(IV)

wherein X has the meaning given above.

The novel intermediates of the Formula IV are then nitrated to form the corresponding nitro-iodoimidazoles represented by the general formula

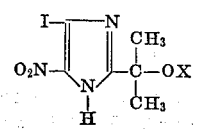

(V)

wherein X has the meaning given above.

A preferred nitration agent suitable for the nitration step is a mixture of about equal volumes of concentrated nitric acid and concentrated sulfuric acid. The nitration is conveniently carried out at low temperatures. However, low temperatures are not essential as the reaction could be run at room temperature, e.g., from 20° C. to 25° C. The preferred temperature range for carrying out the reaction is from about −25° C. to about 60° C. An especially preferred temperature range is from −25° C. to 25° C. Where compounds of Formula V wherein X is methyl are desired, the reaction mixture is poured over ice after from about from 30 to 60 minutes, and the precipitated product recovered by conventional techniques, e.g., filtration. A second crop of product is obtained by partially neutralizing the filtrate with concentrated ammonia at about 0° C. to 5° C. Where compounds of Formula V wherein X is hydrogen are desired, the reaction mixture is allowed to stand after the initial reaction period, at room temperature, e.g., 20° C. to 25° C., for from about 35 to about 48 hours. The product is obtained in a similar manner. While the nitration agent described above is the preferred one, any conventional nitration agent could be utilized in the reaction. Examples of such agents include a mixture of nitric acid and a strong mineral acid, a mixture of nitric acid and acetic anhydride or any of the nitrating agents which are conveniently used to nitrate aromatic compounds such as sodium nitrate or copper nitrate together with a dehydrating agent such as concentrated sulfuric acid.

The novel compounds of Formula V are reacted to remove the iodine atom. It has been discovered that the step of removing the iodine may be accomplished in a single operation without the prior art disadvantage of also reducing the nitro group, by utilizing sodium borohydride. The reaction may be carried out in alkaline aqueous media, or in a lower aliphatic alcohol, isopropanol being preferred. The reaction is carried out at a temperature range of from about −25° C. to about 60° C., and a preferred temperature range of from about −5° to about 5° C. The reaction is begun utilizing a quantity of sodium borohydride which approximates about one-half of the starting iodonitroimidazole material, on a molar basis. The reaction temperatures are maintained with the addition of small increments of additional sodium borohydride until the presence of the starting material is no longer detected in the reaction mixture. The presence of the starting material may be checked by methods such as, for example, by periodically analyzing a sample of reaction mixture by thin layer chromatography. The reaction mixture is then neutralized with a mild acid such as, for example, acetic acid and the product extracted with an organic solvent such as, for example, ethyl acetate.

Whereas the foregoing discussion has dealt with the parallel synthesis of two compounds, e.g., starting with the formation of Formula III compounds and proceeding through iodination, nitration and sodium borohydride treatment, the present invention encompasses a third series of novel intermediates possessing unsaturation in the substituent at position 2. These compounds may optionally be initiated into the synthesis at either of two levels. First, the compound of Formula V, e.g., those represented by the formula

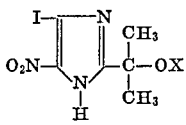

wherein X may be hydrogen or methyl are treated to remove a molecule of water or methanol, for example, by heating to from about 70° C. to about 100° C., and preferably to from about 85° C. to about 95° C. in the presence of a strong mineral acid such as, for example, sulfuric acid, to yield the novel intermediate compound represented by the formula

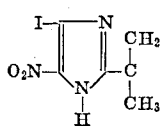    Va

The compound of Formula Va is then treated with sodium borohydride in an analogous manner to that described for the compounds of Formula V.

The sodium borohydride treatment of the compounds of Formulae V and Va results in the novel intermediate compounds represented by the general formula

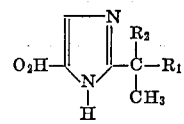    (VI)

wherein $R_1$ may be hydroxy or methoxy; $R_2$ may be methyl or $R_1$ plus $R_2$ may be the group=$CH_2$.

As an alternative synthesis, compounds represented by the formula

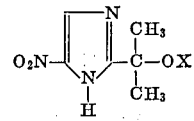

wherein X may be methyl or hydrogen are treated to remove a molecule of water or methanol as has been described to form the compound represented by the Formula VI wherein $R_1$ plus $R_2$ is the group=$CH_2$, e.g.,

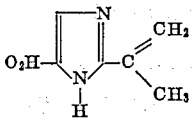

The novel end product represented by the formula

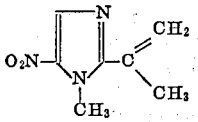

may also be obtained by treating the two other novel end products, viz.

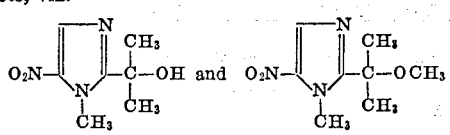

to remove a molecule of water and methanol, respectively, as has been indicated.

The three novel intermediates represented by the general Formula VI are then 1-methylated to yield the novel end products of the present invention viz.

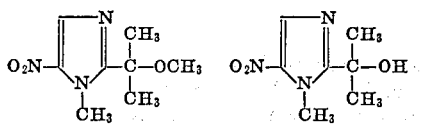

and

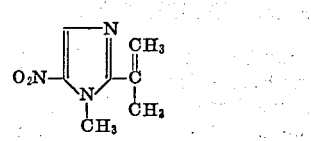

The 1-methylation may be carried out utilizing any conventional alkylating agent such as dimethylsulfate or a methyl halide, dimethylsulfate being preferred. The reaction is carried out at temperatures between from about 50° C. and about 110° C. A more preferred temperature range is between from about 60° and about 85° C. The reaction is conveniently carried out in the presence of an inert organic solvent though it can, if desired, be carried out in the absence of solvent. Suitable solvents for carrying out the methylation reaction are those inert organic solvents which are not alkaline in reaction. Representative examples of such solvents are dioxane, butanol and toluene, toluene being preferred.

The sequential preparation of each of the novel end products and novel intermediates of the present invention may be ascertained from the following reaction scheme. The reactions marked with an asterisk represent optionally alternate paths of synthesis.

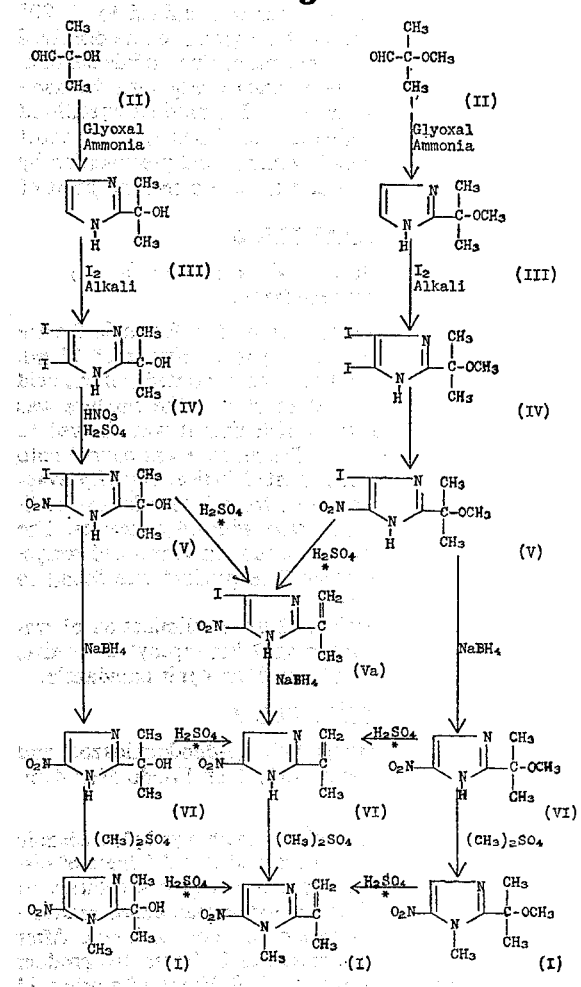

The novel 1-methyl-2-substituted 5-nitroimidazoles produced according to the present invention are useful as chemotherapeutic agents. More particularly, the novel imidazoles of the present invention possess antiprotozoal and antibacterial properties which make them effective against a variety of diseases. The products of the present invention are particularly effective in the treatment of histomoniasis, an affliction of turkeys, also known as turkey blackhead disease, which is caused by the protozoan parasite Histomonas meleagridis. When used for this purpose, the products of the present invention are administered to the fowl via their drinking water or as an intimate mixture in their feed ration. The therapeutically active products of the present invention can be suitably prepared as a premix, or as a feed supplement containing about 1 percent to about 90 percent by weight of the premix formulation.

The premix formulations can also contain carriers or diluents such as corn, germ meal, lactose, corn starch, talc, gelatin, magnesium stearate, and the like. Other compatible medicaments may also be added to the premix. The premix is then added to commercial feed and intimately mixed therewith to obtain uniform distribution yielding an effective concentration level for preventive and therapeutic use. The effective concentration generally is in the range of from about 0.001 percent to about 0.05 percent by weight of the novel therapeutic compounds of the present invention in the commercial feed. The preferred concentration will, of course, depend to some extent upon the severity of the infection. In most cases, however, a turkey ration containing 0.0075 percent to about 0.0125 percent by weight of the novel therapeutic compounds of the present invention is preferred for prevention of turkey blackhead disease and about 0.02 to about 0.05 percent is preferred for therapy.

The feed supplement or premix containing the novel therapeutic compounds of the present invention can be readily mixed with the turkey ration by any conventional technique for mixing feeds.

The novel therapeutically active products of the present invention, i.e., 1-methyl-2-isopropenyl-5-nitroimidazole, 1 - methyl-2-(1-methyl-1-methoxyethyl)-5-nitroimidazole and 1-methyl-2-(1-methyl-1-hydroxyethyl)-5-nitroimidazole, are also useful in combatting protozoal infections caused by a variety of organisms among which there can be named Trichomonas vaginalis and Trichomonas foetus.

The compounds of the invention can be administered systemically, for example, orally, with dosage adjusted to individual requirements. They can be administered in conventional pharmaceutical forms, for example, they can be administered in admixture with conventional organic or inorganic pharmaceutical carriers suitable for oral administration such as starches, lactose, sucrose, gelatin, magnesium stearate, talc, vegetable oils, gums and the like. The pharmaceutical preparations may be in any conventional solid or liquid form common in the art. The preparations can be submitted to conventional pharmaceutical expedients, for example, sterilization, and they can contain pharmaceutical adjuvants such as preservatives, sterilization agents, wetting agents, emulsifying agents and the like. The pharmaceutical preparations can also contain other therapeutically valuable substances.

The activity of the therapeutic products of the present invention against turkey blackhead disease is demonstrated by the following experiment.

Ten turkey poults per turkey group and ten turkeys for each of the infected unmedicated controls (IUC) and uninfected unmedicated controls (UUC) were employed. Indicated amounts of the therapeutically active products of the present invention were mixed with the turkey feed in a mechanical mixer and given 72 hours in advance of the infection. The infection consisted in administering orally by pipette 500 embroyoned eggs of Heterakis gallinae containing Histomonas meleagridis. The turkeys were kept on the test mixture for a total of 24 days comprising 3 days pre- and 21 days post-exposure. The birds were then sacrified and autopsied and examined for hepatic and cecal lesions. The number of survivors and the intensity of lesions appearing in the liver and ceca of each turkey was observed. The designation ADI stands for average degree of infection. These figures are representative of the intensity of lesions (if any) appearing in the cecum of each bird. Rating of 1 (slight pathology) to 5 (death) indicates the severity of disease. It is considered that a compound producing an ADI of 1.5 or less is effective against the organism tested. The percent mortality for each group was recorded. The relative growth rate of the treated turkeys and uninfected controls was determined and is expressed as the weight gain (WG) in percent. One-hundred represents the growth rate of the uninfected untreated controls. The results of experiments in which infected turkeys were fed various concentrations of the therapeutically active products of the present invention are set forth in the following table.

| Therapeutic compound | Conc. in feed, percent | Weight gain, percent | Mortality, percent | ADI |
| --- | --- | --- | --- | --- |
| UUC | None | 100 | 0 | 0.0 |
| IUC | None |  | 100 | 5.0 |
| A | 0.0125 | 100 | 0 | 0.0 |
| A | 0.00625 | 104 | 0 | 0.0 |
| B | 0.0125 | 99 | 0 | 0.0 |
| B | 0.00625 | 87 | 0 | 1.2 |
| C | 0.0125 | 102 | 0 | 0.0 |
| C | 0.00625 | 104 | 0 | 0.0 |

A—1-methyl-2-(1-methyl-1-hydroxyethyl)-5-nitroimidazole.
B—1-methyl-2-isopropenyl-5-nitroimidazole.
C—1-methyl-2-(1-methyl-1-methoxyethyl)-5-nitroimidazole.

The following examples are illustrative but not limitative of the processes of the invention. All temperatures are in degrees centigrade and all melting points are corrected.

EXAMPLE 1

α-Bromoisobutyraldehyde dimethylacetal

A five liter three-neck flask equipped with a thermometer, stirrer, reflux condenser and dropping funnel was charged with 2250 ml. absolute methanol and 482 grams isobutyraldehyde, 295 ml. of bromine was dropped into the mixture with stirring and the temperature was brought to 55° whereupon the bromine color rapidly disappeared.

After the bromine color had disappeared, the reaction mixture was neutralized by the gradual addition (foaming) of 300 grams powdered calcium carbonate, filtered to remove excess calcium carbonate and quenched in ice water. The heavy oil precipitate was extracted four times with 500 ml. methylene chloride and the combined extracts were washed with water and dried over sodium sulfate. After distilling off the solvent at atmospheric pressure, the residue was distilled in the vacuum, 18 mm. Hg, at 55–63°. The product was obtained as a clear colorless oil having a camphor-like odor.

EXAMPLE 2

α-Methoxyisobutyraldehyde

A five liter three-neck flask equipped with stirrer, reflux condenser, dropping funnel and heating mantle was charged with 2250 ml. distilled water and 450 grams tartaric acid. 132 grams of anhydrous sodium carbonate were added in portions under stirring (foaming). The clear solution was heated to rapid boiling and 492 grams α-bromoisobutyraldehyde were gradually added with stirring over a period of about two hours. Refluxing was continued for one additional hour after which about 400 ml. of liquid was distilled off. The product was separated by salting out of solution as a light upper layer utilizing 150 grams ammonium sulfate. The crude product material was purified by heating with anhydrous calcium chloride and fractionation to give α-methoxyisobutyraldehyde, B.P. 95–100°.

EXAMPLE 3

2-(1-methyl-1-methoxyethyl)imidazole

In this example 204 grams of the α-methoxyisobutyraldehyde prepared in Example 2 were added to 500 ml. concentrated aqueous ammonia at 5°. To this mixture was added 280 ml. of a 40 percent aqueous commercial glyoxal solution. The reaction proceeded exothermically, the temperature reaching between 45° and 50° The crystalline product which was allowed to stand overnight at 0°–10° was filtered and washed with 100 ml. distilled water and 150 ml. acetone. The purified product was found to have a melting point of 163–164°.

EXAMPLE 4

2-(1-methyl-1-hydroxyethyl)imidazole 45 grams of α-hydroxyisobutyraldehyde were added to 125 ml. concentrated aqueous ammonia followed by the gradual addition under chilling of 70 ml. of a 40 percent aqueous commercial glyoxal solution. The mixture was allowed to stand at room temperature (20°–25°) for 48 hours during which it became strongly discolored and deposited some of the product in the form of plates. The solid was filtered and the filtrate extracted on a liquid-liqiud extraction for 48 hours utilizing ethyl acetate. The extract was evaporated in vacuo and the residue treated by slurrying with ether to recover the product. The combined solids were dissolved in 200 ml. methanol, the solution charcoaled, the filtrate evaporated and the residue slurried with ether. The recovered product was found to have a M.P. of 202–203°.

EXAMPLE 5

2-(1-methyl-1-hydroxyethyl)-4,5-diiodoimidazole 2.5 grams of the 2-(1-methyl-1-hydroxyethyl)imidazole produced in Example 4 were dissolved in 250 ml. of hot distilled water. The solution was then chilled to 10–20° with stirring and a solution of 10 grams iodine dissolved in 60 ml. of a 30 percent aqueous sodium iodide solution was gradually added thereto concurrently with the addition of 6 grams sodium carbonate. The product crystallized from solution and was filtered after 4 hours. The product was purified by dissolving in ethanol and precipitation by distilled water and was found to have a melting point of 188°.

EXAMPLE 6

2-(1-methyl-1-hydroxyethyl)-4(or 5)iodo-5(or 4) nitroimidazole 6.0 grams of the product obtained in Example 5 were added in portions under stirring to a mixture of 10 ml. nitric acid (d.=1.5) and 10 ml. concentrated sulfuric acid while maintaining the mixture at 0°. The mixture was stirred for 2 hours during which time it was allowed to warm to room temperature. The mixture was poured onto ice, filtered to remove precipitated iodine, partially evaporated, neutralized to a pH of from 2 to 4 by the addition of ammonia and extracted with ethyl acetate. The product was isolated by evaporation in vacuo and recrystallized from distilled water. The product was found to have a melting point of 183°.

The product was resolidified under elimination of water to yield the corresponding 2-isopropenyl derivative, e.g., 2-isopropenyl-4(or 5)iodo-5(or 4)nitroimidazole.

EXAMPLE 7

2-(1-methyl - 1 - methoxyethyl)-4,5-diiodoimidazole and 2 - (1-methyl-1-methoxyethyl)-4(or 5)iodo-5(or 4)nitroimidazole 70 grams of the 2-(1-methyl-1-methoxyethyl)imidazole produced in Example 3 was suspended in 2.5 liters of distilled water and 625 ml. of a 3 N aqueous solution of sodium hydroxide. 255 grams iodine was added gradually with stirring over a period of about 2 hours. After stirring the mixture for a period of 12 hours, the product is precipitated by the addition of 60–70 ml. of acetic acid and dried.

200 grams of the crude product in a finely powdered condition were gradually added with stirring at 0° to a mixture of 300 ml. nitric acid (d.=1.5) and 300 ml. of concentrated sulfuric acid. The temperature was maintained with stirring for an additional 30 minutes. The mixture was then poured over about one kilogram of ice. After the ice had melted, the mixture was filtered to remove precipitated iodine and product. The filtrate was partially neutralized by the addition of 700 ml. of concentrated ammonia while maintaining chilling of the mixture. The addition of the ammonia caused the precipitation of a second quantity of product. The combined product was slurried with 300 ml. distilled water and dissolved by the addition of about 350 ml. of aqueous 3 N sodium hydroxide. The solution was filtered to remove mechanical impurities and the filtrate was acidified by the gradual addition of 40–45 ml. acetic acid. The crystalline precipitate was filtered by suction and rinsed with water. The product was found to have a melting point of 176–177°.

The product was resolidified above the melting point under a loss of methanol to yield 2-isopropenyl-4(or 5) iodo-5(or 4)nitroimidazole.

EXAMPLE 8

2-(1-methyl-1-hydroxyethyl)4(or 5)nitroimidazole 119 grams of 2-(1-methyl-1-hydroxyethyl)-4(or 5) iodo-5(or 4)nitroimidazole as produced in Example 6 were dissolved in 500 ml. 3 N sodium carbonate solution and the solution chilled to between 0–5°. 7.6 grams sodium borohydride were added under stirring at the same temperature. The reaction required from 6 to 8 hours during which about 2.4 grams of additional sodium borohydride has to be added. When no or only traces of the starting material could be detected, 130 ml. acetic acid was added in one portion at 0°. The neutralized solution was extracted in a liquid-liquid extractor utilizing ethyl acetate. The extract was charcoaled hot and evaporated to dryness. The crystalline residue was recrystallized from 150 ml. of distilled water. The product was found to have a melting point of 192–193°.

EXAMPLE 9

2-(1-methyl-1-methoxyethyl)-4(or 5)nitroimidazole

The example is carried out in a manner entirely analogous to that of Example 8 utilizing as a starting material 2 - (1 - methyl - 1 - methoxyethyl)-4(or 5)iodo-5(or 4)nitroimidazole as produced in Example 7. The product was found to have a melting point of 176–177°.

EXAMPLE 10

2-isopropenyl-4(or 5)nitroimidazole 34.2 grams 2 - (1 - methyl - 1 - hydroxyethyl)-4(or 5)nitroimidazole produced in Example 8 or 39 grams of 2 - (1 - methyl - 1 - methoxyethyl)-4(or 5)nitroimidazole produced in Example 9 were added to 50 ml. concentrated sulfuric acid and the mixture heated on a steambath for one hour. The mixture was then poured over 200 grams of ice and neutralized to a pH of 2–5 under chilling with concentrated ammonia. The product crystallized rapidly from solution. The product was filtered, dried and found to have a melting point of 197–198°.

Reduction of 2 - isopropenyl - 4(or 5)iodo-5(or 4) nitroimidazole produced in Example 7 with sodium borohydride in a manner analogous to that of Examples 8 and 9 gave an identical product.

EXAMPLE 11

1-methyl-2-(1-methyl-1-methoxyethyl)-5-nitroimidazole 24 grams of 2-(1-methyl-1-methoxyethyl) - 4(or 5) nitroimidazole as produced in Example 9 and 23 grams dimethylsulfate were heated to 60° for from 6 to 8 hours. The mixture became homogeneous after about 3 hours and later precipitated the methyl sulfate of the product in large prisms. The product was rinsed with ether and dissolved in 50 ml. distilled water. The resulting solution was made alkaline under chilling with 50 ml. 3 N aqueous sodium hydroxide and extracted with 100 ml. methylene chloride. The solvent was evaporated and the product recrystallized from ethanol. The product was found to have a melting point of 104–105°.

EXAMPLE 12

1-methyl-2-(1-methyl-1-hydroxyethyl)-5-nitroimidazole 11.5 grams of 2-(1-methyl-1-hydroxyethyl)-4(or 5) nitroimidazole produced in Example 8 and 12.7 grams dimethylsulfate were maintained at 60° for from 6 to 8 hours. The mixture was diluted with 20 grams ice water and the solution mixed with 100 ml. methylene chloride and 40 ml. 3 N sodium hydroxide under chilling. The methylene chloride layer was washed with two portions of 20 ml. cold sodium hydroxide solution with one 20 ml. portion cold distilled water, dried over magnesium sulfate and evaporated in vacuo. The crystalline residue was recrystallized from ether and found to have a melting point of 105–106°.

EXAMPLE 13

1-methyl-2-isopropenyl-5-nitroimidazole 34 grams of 2 - isopropenyl - 4(or 5)nitroimidazole produced in Example 10 were refluxed with 300 ml. toluene and 35 grams dimethylsulfate. After one hour the mixture was chilled and the supernatant toluene was decanted from the syrupy mixture in the bottom of the vessel. The syrupy mixture was dissolved in 50 ml. distilled water to which was added 300 ml. methylene chloride and the whole was chilled to 0–10°. 100 ml. of cold aqueous 3 N sodium hydroxide were added to the mixture which formed two layers. The layers were separated and the methylene chloride was washed twice with 20 ml. of an aqueous 3 N solution of sodium hydroxide and then with 50 ml. distilled water. The solution was then evaporated and the residue dried. Recrystallization from ether gave a product which was found to have a melting point of 56–57°.

EXAMPLE 14

Treatment of the product produced in either Example 11 or Example 12 to remove a molecule of methanol and water, respectively, in a manner analogous to that of Example 10 yielded a product identical to that of Example 13.

What is claimed is:

1. The process of preparing 1-methyl-2-substituted 5-nitroimidazoles represented by the formula

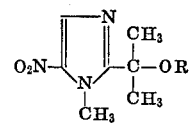

wherein R is hydrogen or methyl that comprises:
(a) reacting an aldehyde of the formula

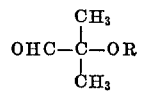

wherein R has the meaning given with glyoxal and ammonia in aqueous media to yield an imidazole represented by the formula

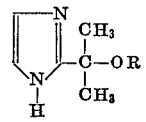

wherein R has the meaning given;
(b) reacting said imidazole with an iodinating agent to form a diiodoimidazole represented by the formula

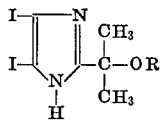

wherein R has the meaning given;
(c) reacting said diiodoimidazoles with a nitrating agent to form nitroiodoimidazoles represented by the formula

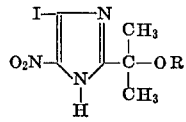

wherein R has the meaning given;
(d) reacting said nitroiodoimidazole with sodium borohydride at a temperature of from about −25° C. to about 60° C. to form 5-nitroimidazoles represented the formula

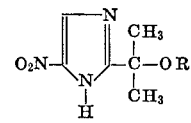

wherein R has the meaning given; and
(e) reacting said 5-nitroimidazoles with a methylating agent to form 1-methyl-5-nitroimidazoles represented by the formula

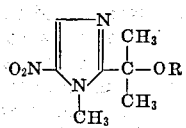

wherein R has the meaning given; and (f) recovering the product.

2. The process according to claim 1 wherein said iodinating agent is an aqueous solution of sodium iodide and iodine and said reaction (b) is carried out in alkaline media.

3. The process according to claim 1 wherein said reaction (d) is carried out at a temperature between from about $-5°$ C. to about $5°$ C.

4. The process according to claim 1 wherein said methylating agent is dimethylsulfate and said reaction (e) is carried out at a temperature of from about $60°$ C. to about $85°$ C.

5. The process of preparing 1-methyl-2-substituted-5-nitroimidazoles represented by the formula

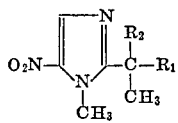

wherein $R_1$ is hydroxy or methoxy and $R_2$ is methyl; or $R_1$ plus $R_2$ is the group $CH_2=$ comprising reacting a nitroiodoimidazole represented by the formula

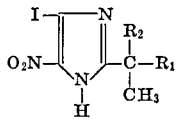

wherein $R_1$ and $R_2$ have the meaning given with sodium borohydride at a temperature of from about $-25°$ C. to about $60°$ C. to form 5-nitroimidazoles represented by the formula

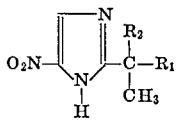

wherein $R_1$ and $R_2$ have the meaning given; 1-methylating said 5-nitroimidazoles; and recovering the product.

6. The process according to claim 5 wherein said reaction with sodium borohydride is carried out at a temperature between from about $-5°$ C. to about $5°$ C.

7. A compound represented by the formula

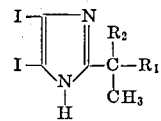

wherein $R_1$ is hydroxy or methoxy and $R_2$ is methyl.

8. A compound represented by the formula

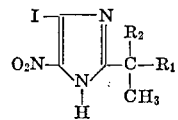

wherein $R_1$ is hydroxy or methoxy and $R_2$ is methyl; or $R_1$ plus $R_2$ is the group $CH_2=$.

9. 1-methyl-2-isopropenyl-5-nitroimidazole.

10. 1-methyl-2-(1-methyl - 1 - methoxyethyl)-5-nitroimidazole.

References Cited

UNITED STATES PATENTS

| | | | |
|---|---|---|---|
| 3,502,776 | 3/1970 | Hoffer et al. | 424—273 |
| 3,290,328 | 12/1966 | Kollonitsch | 260—309 |
| 3,361,755 | 1/1968 | Green | 260—309 |

OTHER REFERENCES

Netherlands application 64-13814, Merck & Co. (May 1965).

Roe, J. Chem. Soc., 1963, 2195–200.

HENRY R. JILES, Primary Examiner

G. T. TODD, Assistant Examiner

U.S. Cl. X.R.

424—273